Feb. 5, 1935.  J. M. JUNKIN  1,989,932
WEED ERADICATING DEVICE
Filed July 24, 1933
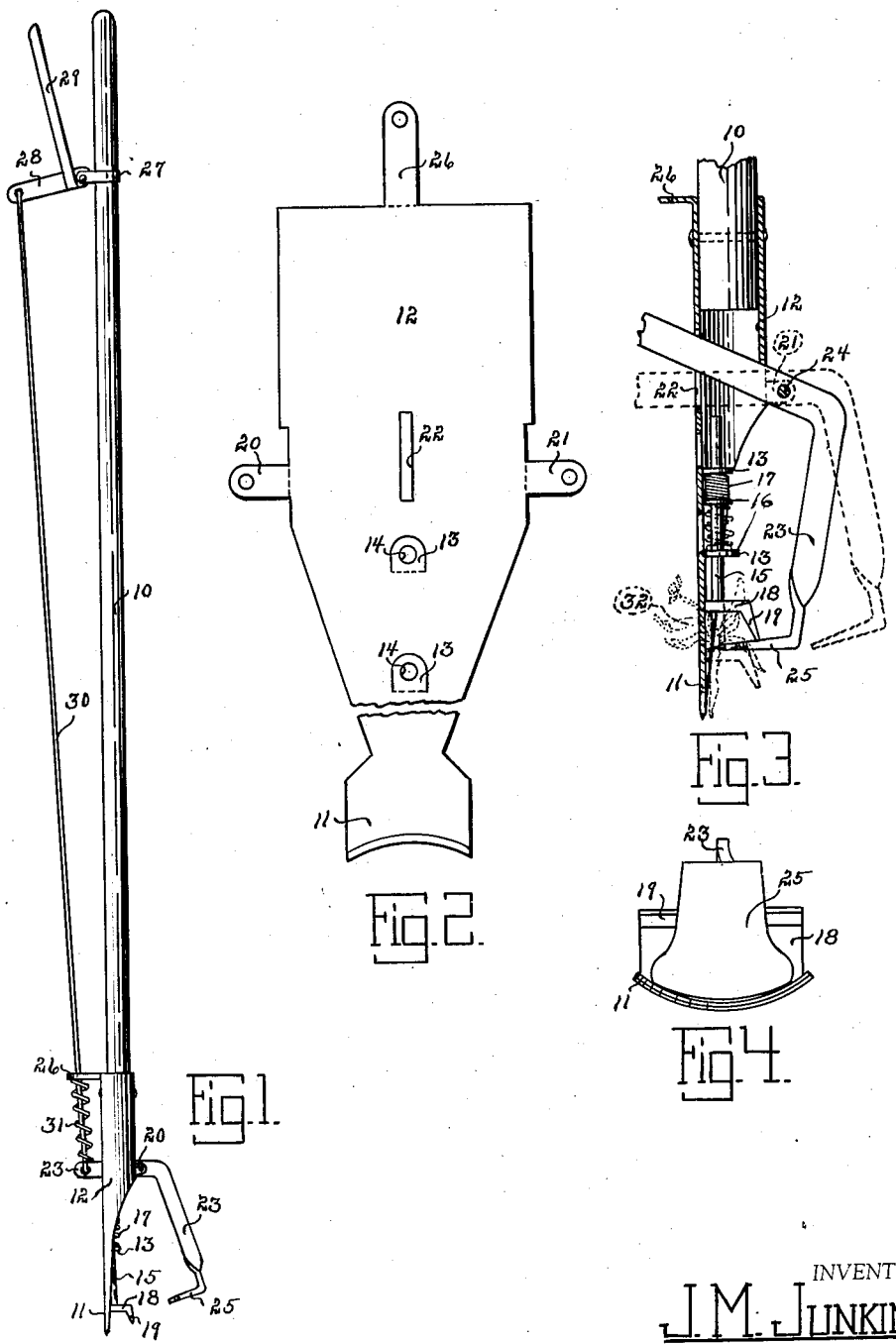

Patented Feb. 5, 1935

1,989,932

UNITED STATES PATENT OFFICE 1,989,932

WEED ERADICATING DEVICE

Joy M. Junkin, Perry, Iowa

Application July 24, 1933, Serial No. 681,886

5 Claims. (Cl. 55—148)

The principal object of this invention is to provide a tool for removing undesirable weeds such as dandelions or like from lawns that may be easily functioned while the operator is standing in an erect position.

A further object of my invention is to provide a tool for eliminating weeds that not only severs the weed from its roots, but makes it possible for the operator to pick up the weed so cut for transportation purposes without stooping.

A still further object of my invention is to provide a weed eradicating device that is capable of cutting the weed from its roots, picking up the weed so cut, and catapulting the picked up weed a considerable distance from the operator of the tool.

A still further object of this invention is to provide a weed eradicator that is capable of cutting down an individual weed without seriously harming surrounding vegetation.

A still further object of my invention is to provide a weed eradicating device that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my weed eradicating device ready for use.

Fig. 2 is a top plan view of a blank stamped from a sheet of metal for forming the blade and base portion of the device after it has been properly bent.

Fig. 3 is a side sectional view of the lower portion of the device and more fully illustrates its operation and construction.

Fig. 4 is a front end view of the lower portion of my device.

In the maintaining of beautiful lawns and like one is always troubled with undesirable weeds such as dandelions. The problem is to eradicate such plant life without harming the surrounding grass or other vegetation and with ease and rapidity of operation. I have made this possible with my new weed eradicating tool.

Referring to the drawing, I have used the numeral 10 to designate the elongated handle portion of the invention. This handle may be of any suitable material such as wood. As noted in Fig. 2, the cutting blade portion and base portion of the lower end of the tool are stamped from a single sheet of metal and in this connection I have used the numeral 11 to designate the cutting blade portion and the numeral 12 to generally designate the principal base portion of the invention which is integrally formed with the blade portion 11. The rear end portion of the member 12 is substantially wider before bending than the width of the blade 11 and in manufacturing my device this portion 12 is bent into a tube and around the lower end portion of the handle 10, as shown in Fig. 1.

This tubular base portion is secured to the handle 10 by any suitable means such as rivets or bolts. By bending the portion 12 into tube construction the cutting blade portion 11 will also bend into a slight arc transversely of the longitudinal axis of the blade, as shown in Fig. 4. This is desirable and to further promote the efficiency of the blade in cutting the weed the cutting edge of the blade is concaved, as shown in Fig. 2. When the blade and base portion are stamped out two spaced apart ears 13 are also cut in the member 12 on its center line. These two ears are bent upwardly, as shown in Fig. 3 and as each ear has a hole 14 in it, these two ears provide two spaced apart bearing members. The numeral 15 designates a shaft slidably mounted in the two ears 13. The numeral 16 designates a washer or like rigidly secured on the shaft 15 and positioned between the two ears 13. The numeral 17 designates a coil spring embracing the shaft 15, having its rear end engaging the rear ear 13, and its forward end engaging the washer 16. The purpose of this spring 17 is to yieldingly hold the shaft 15 in a forward position of its sliding movement in the two ears. The numeral 18 designates a catapulting head rigidly formed on the forward or lower end of the shaft 15. This head has its lower portion rounded to slidably engage the bottom circular portion of the member 12 and blade 11. This lower rounded portion of the head 18 not only prevents undesirable rotation of the shaft 15 and that of itself, but scrapes and cleans a substantial length of the blade 11 when the shaft 15 is reciprocated. The numeral 19 designates a forwardly and slightly upwardly extending flange integrally formed on the upper end portion of the head 18.

The numerals 20 and 21 designate two ears diametrically positioned from each other and on each side of the base portion 12 at the time the base portion 12 is originally stamped out. After the base portion 12 is bent into tubular construction these two ears 20 and 21 will be positioned close together and will extend upwardly and outwardly from the tool when the same is held in a horizontal position. The numeral 22 designates a longitudinally extending slot formed in the bottom of the member 12 and positioned to the rear of the ears 13, as shown in Fig. 2. The numeral 23 designates an arm supported by and pivotally connected to the ears 20 and 21 by bolt, rivet, or like 24 which passes first through one ear, then loosely through the arm, and then through the other ear on the other side of the arm. This arm 23 is bent in its center portion in order that its rear end portion will extend downwardly through the slot 22, and its forward end portion will extend and normally rest above the blade portion 11, as shown in Fig. 3. The numeral 25 designates a hook portion integrally formed on the forward end of the arm 23 and extending toward the blade portion 11. As this element 25 is capable of engaging the upper surface of the blade 11 at times its lower marginal edge is rounded to conform to the circular construction of the blade 11, as shown in Fig. 4. The numeral 26 designates an ear formed on the rear portion of the base 12 when the same is stamped. This ear 26 is bent downwardly and is therefore positioned below the base 12 and extends transversely of the longitudinal axis of the handle 10. The numeral 27 designates a bearing band secured to the upper end of the handle 10, as shown in Fig. 1. The numeral 28 designates a link having its upper end pivotally secured to the member 27. The numeral 29 designates a grip lever rigidly secured to the link 28 and extending to the rear of the tool, as shown in Fig. 1. The numeral 30 designates a rod having its forward end pivoted to the rear end of the arm 23, its length loosely passing through the ear 26, and its other end pivoted to the outer end of the link 28.

The numeral 31 designates a coil spring embracing the rod 30, having its rear end engaging the ear 26 and its forward end engaging the lower rear end of the arm 23.

To operate the device it is merely necessary for the operator to grasp the handle 10 and force the blade 11 through the lower portion of the plant to be removed which successfully severs it from its roots. This action, however, will cause the plant and surrounding dirt to engage the head 18 and force it to the rear from a position shown in dotted lines in Fig. 3 and against the action of the spring 17. While the blade is still in the ground and the weed is above and on the blade 11 and in engagement with the head 18 the grip element 29 is manually moved toward the handle 10. This action naturally moves the rod 30 to the rear, against the action of the spring 31, and moves the forward end portion of the arm 23 downwardly to such an extent that the hook portion 25 will engage the undesirable weed on the blade 11 and will be positioned forward of the head 18 and its flange 19, as shown in Fig. 3. At this moment, the tool may be lifted upwardly and will carry with it the severed weed which will be securely clamped between the blade 11 and the hook element 25. Also, it will be noted that the catapulting head 18 will be in a rear position due to the flange 19 engaging the rear side of the element 25. Naturally, as long as the element 25 is in a lowered position on the weed and the blade 11 the head 18 will be prevented from being shot forwardly by the spring 17. To dispose of the weed it is merely necessary to release the grip element 29. This will permit the spring 31 to move the rod 30 forwardly and move the forward end of the arm 23 upwardly out of contact with the severed weed and the flange 19 on the head 18.

With the tool pointed in the general direction it is desired to catapult or shoot the severed weed, the head 18 upon being released by the arm 23 will shoot forwardly throwing the severed weed a goodly distance from the operator. This feature is highly desirable as an operator is not required to stoop during the cutting operation or walk with the tool to dispose of the severed weed outside of the lawn. If the operator has a receptacle for receiving the severed weeds he will not have to walk over to the receptacle each time with each weed, but can stand in one place and shoot the severed weeds into the receptacle.

In order that no substantial amount of earth will be removed with the severed weed the forward end portion of the blade portion 11 should be wider than it is at its rear portion, as shown in Fig. 2. The numeral 32 designates a severed weed shown in dotted lines in Fig. 3.

From the foregoing it will readily be seen that I have provided a weed eradicating tool that will successfully sever the weed from its roots, pick the weed up, and throw it a substantial distance from the operator.

Some changes may be made in the construction and arrangement of my improved weed eradicating device without departing from the real spirit and purpose of my invention, and it is my intention to cover by my claims any modified forms of structure or use of mechanical equivalents which may be reasonably included within their scope.

I claim:

1. In a device of the class described, a weed eradicator having an elongated handle member, a blade secured to the forward end of said handle member, a shaft slidably mounted above said blade, a means for yieldingly holding said shaft in its forward sliding position, an arm pivotally secured at the forward end of said handle member, a manual means for operating said arm, and a hook member on the free end of said arm capable of extending beyond the forward end of said shaft at times for limiting the forward movement of said shaft.

2. In a device of the class described, an elongated handle member, a blade secured to the forward end of said handle member curved in cross section, a shaft slidably mounted above said blade, a head member on the forward end of said shaft, a spring for yieldingly holding said shaft in its forward sliding position, a tong arm pivotally secured at the forward end of said handle member having its free end positioned above said blade and curved to conform to and rest in the curvature of said blade when moved in one direction, a manual means for moving said arm into contact with said blade, and a spring for yieldingly holding said arm away from said blade.

3. In a device of the class described, an elongated handle, a blade secured to the forward end of said handle, a shaft slidably mounted above said blade, a coil spring for holding said shaft in the forward position of its sliding movement, a head element on the forward end of said shaft, a tong arm pivotally secured at the forward end of said handle member having its free end terminating a substantial distance in the rear of the forward end of said blade; said tong arm capable of having its forward end in engagement with the forward side of said head element at times, and a means for moving said tong arm into and out of engagement with said head element at times.

4. In a device of the class described, a handle member, a blade secured to the forward end of said handle member, a shaft slidably positioned above said blade, a head element secured to the forward end of said shaft, a coil spring for holding said shaft in the forward position of its sliding movement, a tong arm pivoted to the forward end portion of said handle, a means for moving said tong arm, and a hook portion on the forward end of said tong arm capable of being positioned forward of said head element at times for limiting the forward sliding movement of said shaft; said hook portion extending at approximately a right angle to said blade when in engagement with said head element.

5. In a device of the class described, an elongated handle member, a barrel portion on the forward end of said handle member terminating into a single curved blade, a shaft slidably positioned above said blade, a head element on the forward end of said shaft having its side portion adjacent said blade curved to conform with and slidably engage said blade and its diametrically opposite side portion formed into a forwardly and outwardly extending projection, a coil spring having one end operatively secured to said shaft and its other end in engagement with said blade portion for holding said shaft in the foward position of its sliding movement, and a manually operated catch and release means capable of operatively engaging said head element at times.

JOY M. JUNKIN.